May 9, 1950     J. H. SULZER     2,506,816
PROTECTIVE COVERING FOR CABLES
Filed Nov. 24, 1947
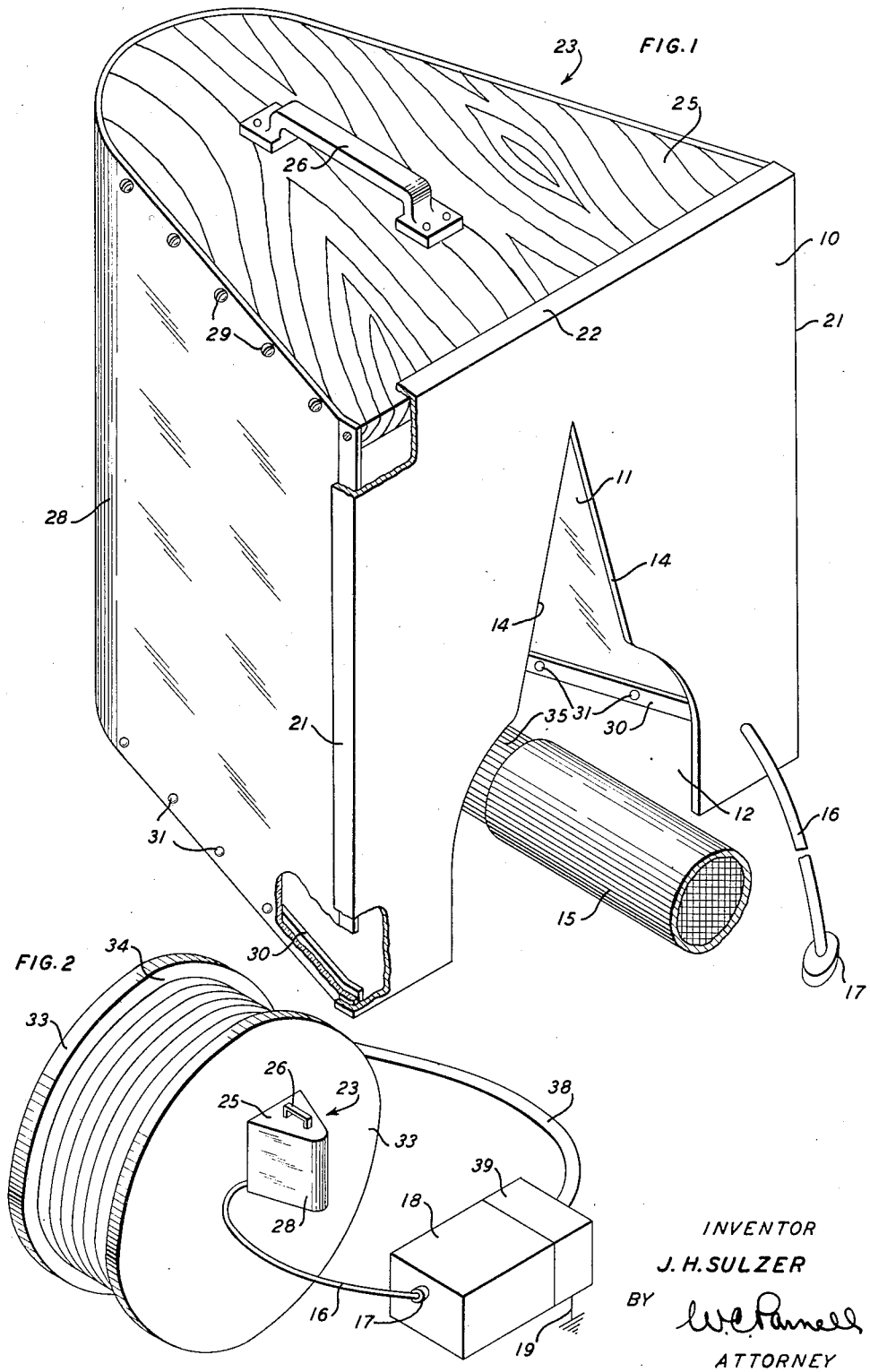
INVENTOR
J. H. SULZER
BY
ATTORNEY Patented May 9, 1950

2,506,816

UNITED STATES PATENT OFFICE 2,506,816

PROTECTIVE COVERING FOR CABLES

John H. Sulzer, Union Beach, N. J., assignor to Western Electric Company, Incorporated, New York, N. Y., a corporation of New York Application November 24, 1947, Serial No. 787,709

1 Claim. (Cl. 174—5)

This invention relates to protective coverings, and more particularly to protective coverings for metal sheathed cables during electrical testing of the cables.

Electrical cables employed in the communication arts, having metal sheaths covering insulated electrical conductors varying in number, thus resulting in cables of various sizes, must be tested before they are put in use. These cables are wound on reels, the inner end of each cable projecting from a head of the reel while the outer end of the cable is free for electrical connection of the conductors thereof with a test set. During the testing operation each electrical conductor is tested against all of its immediately surrounding conductors by subjecting the conductor under test to an electrical current of high potential such as 1500 volts. In this manner a bare spot in the insulation of the conductor under test and a similar weakness in the insulation of any of the immediately adjacent conductors would be detected. If there is no indication in the test set, resulting from the application of high voltage to each conductor, it is then known that the insulation on the conductor is satisfactory.

The inner end of the cable, which is not connected directly to the test set, is in a position where a person might accidently come in contact therewith. To eliminate this hazardous condition, by mounting a shield or opaque covering over the inner end of the cable would interfere with the testing operation by obstructing the operator's view of the ends of the conductors and preventing him from detecting flashes or sparks denoting short circuits between the inner ends of the conductors.

An object of the invention is to provide a protective covering for metal sheathed cables which is simple in structure, readily attachable electrically and mechanically to cables of various sizes, and having a transparent area through which a cable may be readily observed.

With this and other objects in view, the invention comprises a protective covering for metal sheathed cables of various sizes to be tested by the application of high voltage currents to the conductors at one end of each cable being tested, the protective covering having a back member with an inverted V-shaped notch therein whereby the edges thereof may straddle cables of various sizes singly, and frictionally engage the metal sheath thereof to hold the covering on the cable adjacent one end thereof. A hood, supported by the back member, cooperates therewith in surrounding the adjacent end of the cable to protect this end of the cable against accidental contact.

The back member is of conductive material to form not only a firm mechanical connection with the metal sheath of a cable, but also an electrical ground connection with the grounded metal sheath. The hood, carried by the back member, has a transparent portion through which the adjacent end of the cable and the conductors thereof are visible.

Other objects and advantages will be apparent from the following detailed description when considered in conjunction with the accompanying drawing wherein Fig. 1 is an isometric view of the protective covering about to be attached to a metal sheathed cable, and Fig. 2 is an isometric view of the protective covering as attached to the inner end of a cable on a reel and electrically connected to a test set.

The protective covering includes a back member 10 formed of electrical conductive material and having an inverted V-shaped notch 11 extending upwardly from a wider opening 12. The size of the notch 11 is such that the edges 14 thereof may straddle cables of various sizes and form a firm but removable mechanical as well as electrical connection with the metal sheath 15 of the cable on which it is to be mounted. An insulated electrical conductor 16 is connected electrically to the back member 10 and provided with a plug 17 for electrical connection with a test set 18 to include the back member 10 with the metal sheath of the cable in a grounded circuit 19 through the test set.

Side flanges 21 and a top flange 22 of the back member 10 are bent outwardly at right angles to receive the hood, indicated generally at 23. In the present embodiment of the invention, the hood 23 includes a member 25 which is formed of wood, but may be formed of any suitable material, preferably non-conductive material. A handle 26 is mounted upon the member 25 by the aid of which the covering may be readily placed over the end of the cable and removed therefrom. A transparent member 28 of high dielectric material, in the form shown in Fig. 1, extends outwardly from the back member 10 to surround an area similar in contour to member 25. The upper edge of the member 28 is secured in any suitable manner, such as by the aid of screws 29, to the member 25. The lower edge of the member 28 is secured to a reinforcing strip 30 by rivets, screws, or the like, as indicated at 31. The hood 23 is secured in any desired manner to the flanges 21 and 22 of the back member 10.

The protective covering may be readily disposed on the inner end of the cable with the back member 10 positioned closely adjacent one of the heads 33 of the reel 34. By forcing the protective covering downwardly, causing the edges 14 of the notch 11 to straddle the inner end of the cable and firmly engage the metallic sheath 15 thereof, this mechanical connection will hold the protective covering in place, supported by the cable, and assisted by the head 33 of the reel. At this time the electrical connection is also completed between the back member 10 and the metal sheath 15 of the cable, which connection may be completed through the test set 18 by the plug 17, receivable in a given socket in the test set. The transparent portion 28 will surround the conductors 35 of the cable, whereby the operator of the test set may readily observe the existence of any flashes during the testing of the electrical conductors 35 to determine the existence of any defects in the conductors at the inner end of the cable positioned within the protective covering. The protective covering also insures against contact with the cable during the testing operation which might prove dangerous should a person accidently touch the conductors of the cable.

The outer end 38 of the cable is extended into a terminal unit 39 of the test set 18. The metal sheath 15 has been removed from the outer ends of the conductors 35 at this end of the cable and the insulation has been removed from the outer ends of the conductors for connection singly or in groups with terminal clamps in the unit 39. A rotary contactor in the test set completes electrical connections with the terminals in a given order to successively apply the current of high potential to the conductors or groups of conductors. Although the test set 18 and terminal unit 39 are not a part of the present invention, a brief description thereof is thought essential to clarify the function of the protective covering.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

A protective covering for a metal sheathed cable to be tested by the application of high voltage from a test set successively to the outer ends of insulated conductors of the cable wound on a reel, the inner end of the cable extending through a head of the reel, the protective covering comprising a back member formed of conductive material with an inverted V-shaped notch therein having edges to straddle the inner end of the cable adjacent the head of the reel to form a strong mechanical and electrical connection with the metal sheath of the cable, an electrical conductor to connect the back member to the test set to include the metal sheath of the cable in a grounded circuit with the test set, and a transparent hood supported by the back member to cooperate therewith in surrounding the inner end of the cable, having it visible and protecting it against contact with other objects.

JOHN H. SULZER.

REFERENCES CITED

The following references are of record in the file of this patent:

UNITED STATES PATENTS

| Number | Name | Date |
| --- | --- | --- |
| 2,206,471 | Taylor | July 2, 1940 |
| 2,263,319 | Treanor | Nov. 18, 1941 |
| 2,430,703 | Bowen | Nov. 11, 1947 |
| 2,438,006 | Gustafson | Mar. 16, 1948 |